United States Patent
Sanborn et al.

(10) Patent No.: US 12,487,240 B2
(45) Date of Patent: *Dec. 2, 2025

(54) TUMOR HLA MUTATION VERSUS MATCHED NORMAL HLA

(71) Applicant: Nantomics, LLC, Culver City, CA (US)

(72) Inventors: John Zachary Sanborn, Culver City, CA (US); Andrew Nguyen, Culver City, CA (US)

(73) Assignee: Nantomics, LLC, Culver City, CA (US)

( * ) Notice: Subject to any disclaimer, the term of this patent is extended or adjusted under 35 U.S.C. 154(b) by 986 days.

This patent is subject to a terminal disclaimer.

(21) Appl. No.: 17/279,534

(22) PCT Filed: Oct. 10, 2019

(86) PCT No.: PCT/US2019/055695
§ 371 (c)(1),
(2) Date: Mar. 24, 2021

(87) PCT Pub. No.: WO2020/077128
PCT Pub. Date: Apr. 16, 2020

(65) Prior Publication Data
US 2021/0396754 A1    Dec. 23, 2021

Related U.S. Application Data

(60) Provisional application No. 62/744,511, filed on Oct. 11, 2018.

(51) Int. Cl.
| | |
|---|---|
| *C12Q 1/6886* | (2018.01) |
| *A61K 35/17* | (2015.01) |
| *A61K 38/17* | (2006.01) |
| *A61K 39/00* | (2006.01) |
| *A61K 39/395* | (2006.01) |
| *A61K 40/42* | (2025.01) |
| *G01N 33/569* | (2006.01) |
| *G01N 33/574* | (2006.01) |
| *G01N 33/68* | (2006.01) |

(52) U.S. Cl.
CPC ....... *G01N 33/56977* (2013.01); *A61K 35/17* (2013.01); *A61K 38/1774* (2013.01); *A61K 39/0011* (2013.01); *A61K 39/39558* (2013.01); *A61K 40/4202* (2025.01); *C12Q 1/6886* (2013.01); *G01N 33/57492* (2013.01); *G01N 33/6878* (2013.01); *A61K 2039/523* (2013.01); *A61K 2039/5256* (2013.01); *C12Q 2600/106* (2013.01); *C12Q 2600/156* (2013.01); *G01N 2570/00* (2013.01)

(58) Field of Classification Search
CPC ....... G01N 33/56977; G01N 33/57492; G01N 33/6878; G01N 2570/00; A61K 35/17; A61K 38/1774; A61K 39/0011; A61K 39/39558; A61K 40/4202; A61K 2039/523; A61K 2039/5256; A61K 2039/55; A61K 45/06; C12Q 1/6886; C12Q 2600/106; C12Q 2600/156; C07K 16/30

See application file for complete search history.

(56) References Cited

U.S. PATENT DOCUMENTS

| | | |
|---|---|---|
| 7,473,532 B2 | 1/2009 | Darfler et al. |
| 9,824,181 B2 | 11/2017 | Sanborn et al. |
| 2012/0059670 A1 | 3/2012 | Sanborn et al. |
| 2012/0066001 A1 | 3/2012 | Sanborn et al. |

FOREIGN PATENT DOCUMENTS

| | | |
|---|---|---|
| WO | 2017035392 A1 | 3/2017 |
| WO | 2017066256 A2 | 4/2017 |
| WO | 2017184590 A1 | 10/2017 |
| WO | 2020077128 A1 | 4/2020 |
| WO | 2020046587 A9 | 5/2020 |

OTHER PUBLICATIONS

Seliger (Oncoimmunology 2017, vol. 6, No. 2, e1171447(10pages).*
Okwundu (Ann Transl Med 2021;9(12):1041).*
Ventola (P & T (vol. 42, (2017, p. 514–).*
Boegel (.OncoImmunology 3:8, e954893; Aug. 1, 2014 ).*
Castle (BMC Genomics 2014, 15:190).*
Bendjama (Human Vaccines & Immunotherapeutics 2017, vol. 13, No. 9, 1997-2003.*
Sahin (Nature (2017, vol. 547, pp. 222-226).*
Bejerregaard (Cancer Immunol Immunother (2017) 66:1123-1130).*
International Preliminary Report on Patentability Chapter I received for International PCT Application Serial No. PCT/US2019/055695 dated Apr. 22, 2021, 8 pages.
Boegel et al., "A catalog of HLA type, HLA expression, and neo-epitope candidates in human cancer cell lines", Oncoimmunology, 2014, vol. 3, No. 8, e954893, 12 pages (Cited from Specification).
McGranahan et al., "Allele-Specific HLA Loss and Immune Escape in Lung Cancer Evolution", Cell, 2017, vol. 171, pp. 1259-1271.
Chang et al., "Multiple structural and epigenetic defects in the human leukocyte antigen class I antigen presentation pathway in a recurrent metastatic melanoma following immunotherapy", Journal of Biological Chemistry, 2015, vol. 290, No. 44, pp. 26562-26575 (Cited from Specification).

(Continued)

Primary Examiner — Cynthia B Wilder
(74) Attorney, Agent, or Firm — Umberg Zipser LLP; Martin Fessenmaier; Priti Phukan

(57) ABSTRACT

Effectiveness of a neoepitope-based immunotherapeutic composition against a tumor can be increased by predicting the surface presentation of the neoepitope bound to the HLA molecule of the tumor cell. Surface presentation levels of neoepitopes can be predicted by identifying any changes in omics data of the tumor cell that may affect the expression or surface trafficking of the HLA molecule and that may affect binding affinities of neoepitopes to the HLA molecule.

6 Claims, No Drawings

(56) References Cited

OTHER PUBLICATIONS

Sanborn et al., "Double Minute Chromosomes in Glioblastoma Multiforme Are Revealed by Precise Reconstruction of Oncogenic Amplicons", Cancder Research, 2013, vol. 73, No. 19, pp. 6036-6045 (Cited from Specification).
Lundegaard et al., "NetMHC-3.0: accurate web accessible predictions of human, mouse and monkey MHC class I affinities for peptides of length 8-11", Nucleic Acids Research, 2008, vol. 36, pp. W509-W512 (Cited from Specification).
Li et al., "Predicting the Impact of Missense Mutations on Protein-ProteinBinding Affinity", Journal of Chemical Theory and Computation, 2014, vol. 10, pp. 1770-1780 (Cited from Specification).
Witvliet et al., "ELASPIC web-server: proteome-wide structure-based prediction of mutation effects on protein stability and binding affinity", Bioinformatics, 2016, vol. 32, No. 10, pp. 1589-1591 (Cited from Specification).
Amalfitano et al., "Production and Characterization of Improved Adenovirus Vectors with the E1, E2b, and E3 Genes Deleted", Journal of Virology, 1998, vol. 2, No. 2, pp. 926-933 (Cited from Specification).
Carmen et al., "Concepts in antibodyphage display", Briefings in Functional Genomics and Proteomics, 2002, vol. 1, No. 2, pp. 189-203 (Cited from Specification).
Hosse et al., "A new generation of protein display scaffolds for molecular recognition", Protein Science, 2006, vol. 15, pp. 14-27 (Cited from Specification).
International Search Report and Written Opinion received for International Application Serial No. PCT/US2019/055695 dated Feb. 10, 2020, 11 pages.
Speetjens et al., "Clinical impact of HLA class I expression in rectal cancer", Cancer Immunol Immunother, 2008, vol. 57, pp. 601-609.

\* cited by examiner

TUMOR HLA MUTATION VERSUS MATCHED NORMAL HLA

This application claims priority to our co-pending U.S. provisional application Ser. No. 62/744,511, filed Oct. 11, 2018, and which is incorporated by reference herein in its entirety.

Field of the Invention

The field of the invention is computational analysis of omics data, and particularly as it relates to immunotherapeutic treatment to treat a tumor having a HLA mutation.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Personalized cancer treatment using patient or tumor specific mutations as a target of the treatment has gained attention as one of the most desirable options to treat cancer as such neoepitope-based treatments are expected to have increased specificity to attack the tumor by targeting the mutated molecule presented on the tumor cell. Yet, despite the expected specificity, design of an effective neoepitope-based treatment has been fraught with several challenges, including uncertainty in prediction of neoepitope sequences due to the variability in sequencing platform or systems and inaccuracies in algorithms in the prediction of the binding affinity of neoepitopes to some HLA types. In addition, even if accurate neoepitope binding to the patient's HLA type could be calculated, a neoepitope-based treatment may still not be effective to elicit an immune response against the tumor where the HLA-neoepitope complex is not properly formed and/or or sufficiently presented on the antigen presenting cell surface.

Such challenges have become more evident in the recent literature. For example, Boegel et al. (*OncoImmunology* 3:8 e954893, Aug. 1, 2014) discloses that specific types of HLA expression can be upregulated or downregulated as a tumor escape mechanism or cancer cell adaptation mechanism, and also that many tumor cell lines show locus specific, imbalanced HLA expression levels. Similarly, McGranahan et al. (*Cell*, 171, 1259-1271, Nov. 30, 2018) discloses loss of heterozygosity of HLA in tumor samples (e.g., non-small cell lung cancer, etc.), which facilitates immune editing or subclonal mutations in the tumor. In still another example, Chang et al., (*Journal of Bio. Chem.*, 2015 Oct. 30; 290 (44):26562-75) discloses the presence of multiple defects in HLA class I antigen- processing machinery in a recurrent melanoma metastasis, and such multiple defects can be obtained sequentially as a mechanism of immune evasion.

Therefore, even if various tumor specific changes of tumor HLA types have been reported, it is largely unexplored how such changes can be taken into account in developing an immunotherapy to treat the tumor. Thus, there is still a need for improved systems and methods for identifying the tumor HLA mutations and designing the immune therapy responsive to the mutated HLA types.

SUMMARY OF THE INVENTION

The inventive subject matter is directed to various methods for identifying tumor-specific HLA mutations and generating an immune therapy using neoepitope sequences that are predicted to be presented on the cell surface of the antigen presenting cell with the mutated tumor HLA. Thus, one aspect of the inventive subject matter includes a method of treating a patient diagnosed with a tumor. In especially preferred method, omics data for a tumor cell and a matched normal cell from the patient is obtained, and from the omics data of the matched normal cell, an HLA type of the patient is determined. Most typically, the omics data comprises whole genome DNA sequencing, exome DNA sequencing data, or transcriptomics data. Then, by comparing the data for the tumor cell and the matched normal cell, a patient- and tumor-specific HLA mutation and a patient- and tumor-specific neoepitope of the tumor cell can be identified. It is generally preferred that the neoepitope has a length of between 5 and 30 amino acids. Then, a surface presentation level of the neoepitope in the tumor cell is predicted. Most typically, the neoepitope is associated with an HLA molecule having the tumor-specific HLA mutation. Based on the surface presentation level, especially, if the predicted surface presentation level is higher than a predetermined threshold, an immunotherapeutic composition using the neoepitope can be created, and such immunotherapeutic composition can be administered to the patient to treat the tumor.

In some embodiments, tumor-specific HLA mutation is an allele-specific mutation, allele-specific copy number change. In other embodiment, the tumor-specific HLA mutation is a transcriptional defect that may increase or decrease the transcription level of the HLA allele. Thus, preferably, the surface presentation level is predicted by determining an expression level of the HLA molecule and measuring an binding affinity of the neoepitope to the HLA molecule. In some embodiments, the binding affinity is measured in silico, and preferably the binding affinity to the HLA molecule is less than 500 nM. While it may vary depending on the HLA type and/or immunogenicity of the neoepitope, in some embodiment, the predetermined threshold is at least 70% of predicted surface presentation level of the neoepitope associated with the normal HLA type of the patient obtained from the matched normal tissue.

Moreover, it is contemplated that suitable immunotherapeutic compositions include at least one of a vaccine, a neoepitope-specific affinity reagent, and a neoepitope-specific cell based composition. Typically, the neoepitope-specific cell based composition comprises an immune competent cell that is genetically modified to express a chimeric antigen receptor that specifically recognize or bind to the neoepitope. In addition, the vaccine comprises a virus, a yeast, or a bacteria genetically modified to include a nucleic acid encoding the neoepitope, Further, a neoepitope-specific affinity reagent may comprise a neoepitope-specific affinity reagent.

In another aspect of the inventive subject matter, the inventors contemplate a method of improving treatment for a patient diagnosed with a tumor. In this method, omics data for a tumor cell and a matched normal cell from the patient is obtained, and from the omics data of the matched normal cell, an HLA type of the patient is determined. Most typically, the omics data comprises whole genome DNA sequencing, exome DNA sequencing data, or transcriptomics data. Then, by comparing the data for the tumor cell and the matched normal cell, a patient- and tumor-specific HLA mutation and a patient- and tumor-specific neoepitope of the tumor cell can be identified. It is generally preferred that the neoepitope has a length of between 5 and 30 amino acids. Then, a surface presentation level of the neoepitope in the tumor cell is predicted. Then a neoepitope that has a predicted surface presentation level on the tumor cell surface higher than a predetermined threshold can be selected for generating a neoepitope-based immunotherapeutic composition.

In some embodiments, tumor-specific HLA mutation is an allele-specific mutation, allele-specific copy number change. In other embodiment, the tumor-specific HLA mutation is a transcriptional defect that may increase or decrease the transcription level of the HLA allele. Thus, preferably, the surface presentation level is predicted by determining an expression level of the HLA molecule and measuring a binding affinity of the neoepitope to the HLA molecule. In some embodiments, the binding affinity is measured in silico, and preferably the binding affinity to the HLA molecule is less than 500 nM. While it may vary depending on the HLA type and/or immunogenicity of the neoepitope, in some embodiment, the predetermined threshold is at least 70% of predicted surface presentation level of the neoepitope associated with the normal HLA type of the patient obtained from the matched normal tissue.

Moreover, it is contemplated that suitable immunotherapeutic compositions include at least one of a vaccine, a neoepitope-specific affinity reagent, and a neoepitope-specific cell based composition. Typically, the neoepitope-specific cell based composition comprises an immune competent cell that is genetically modified to express a chimeric antigen receptor that specifically recognize or bind to the neoepitope. In addition, the vaccine comprises a virus, a yeast, or a bacteria genetically modified to include a nucleic acid encoding the neoepitope, Further, a neoepitope-specific affinity reagent may comprise a neoepitope-specific affinity reagent. It is contemplated that in some embodiments, the immunotherapeutic compositions can be generated and administered to the patient in a dose and schedule effective to treat the tumor.

Various objects, features, aspects and advantages of the inventive subject matter will become more apparent from the following detailed description of preferred embodiments.

DETAILED DESCRIPTION

The inventors contemplate that characteristics of HLA molecule and/or the HLA expression system can affect the immunogenicity of tumor cell by modulating or changing the presentation of the antigen on the tumor cell surface. Viewed from a different perspective, any defects in the HLA molecule and/or the HLA expression system of the tumor cell that may affect the presentation of the antigen on the tumor cell surface may change the effectiveness of an immune therapy. In this context, the inventors covered that tumor cell-specific changes of HLA molecule can be identified from omics data obtained from the tumor cell and such identified tumor cell-specific changes of HLA molecule can be further used to identify an antigen that can be effectively coupled with such changed HLA molecule. In addition, the inventors further discovered that a likelihood of immune therapy using a tumor antigen can be determined by predicting a surface presentation level of the HLA-antigen complex on the tumor cell surface. Thus, in one especially preferred aspect of the inventive subject matter, the inventors contemplate a method of treating a patient diagnosed with a tumor using a neoepitope-based immune therapy composition by identifying a tumor-specific HLA type or mutation in the HLA molecule in the tumor and tumor-specific neoepitope, and by predicting a surface presentation level of the HLA-antigen complex on the tumor cell.

As used herein, the term "tumor" refers to, and is interchangeably used with one or more cancer cells, cancer tissues, malignant tumor cells, or malignant tumor tissue, that can be placed or found in one or more anatomical locations in a human body. It should be noted that the term "patient" as used herein includes both individuals that are diagnosed with a condition (e.g., cancer) as well as individuals undergoing examination and/or testing for the purpose of detecting or identifying a condition. Thus, a patient having a tumor refers to both individuals that are diagnosed with a cancer as well as individuals that are suspected to have a cancer. As used herein, the term "provide" or "providing" refers to and includes any acts of manufacturing, generating, placing, enabling to use, transferring, or making ready to use.

Obtaining Omics Data

Any suitable methods and/or procedures to obtain omics data are contemplated. For example, the omics data can be obtained by obtaining tissues from an individual and processing the tissue to obtain DNA, RNA, protein, or any other biological substances from the tissue to further analyze relevant information. In another example, the omics data can be obtained directly from a database that stores omics information of an individual.

Where the omics data is obtained from the tissue of an individual, any suitable methods of obtaining a tumor sample (tumor cells or tumor tissue) or normal (or healthy) tissue from the patient are contemplated. Most typically, a tumor sample or normal tissue sample can be obtained from the patient via a biopsy (including liquid biopsy, or obtained via tissue excision during a surgery or an independent biopsy procedure, etc.), which can be fresh or processed (e.g., frozen, etc.) until further process for obtaining omics data from the tissue. For example, tissues or cells may be fresh or frozen. In other example, the tissues or cells may be in a form of cell/tissue extracts. In some embodiments, the tissues or cells may be obtained from a single or multiple different tissues or anatomical regions. For example, a metastatic breast cancer tissue can be obtained from the patient's breast as well as other organs (e.g., liver, brain, lymph node, blood, lung, etc.) for metastasized breast cancer tissues. In another example, a normal tissue or matched normal tissue (e.g., patient's non-cancerous breast tissue) of the patient can be obtained from any part of the body or organs, preferably from liver, blood, or any other tissues near the tumor (in a close anatomical distance, etc.).

In some embodiments, tumor samples can be obtained from the patient in multiple time points in order to determine any changes in the tumor samples over a relevant time period. For example, tumor samples (or suspected tumor samples) may be obtained before and after the samples are determined or diagnosed as cancerous. In another example, tumor samples (or suspected tumor samples) may be obtained before, during, and/or after (e.g., upon completion, etc.) a one time or a series of a cancer treatment (e.g., radiotherapy, chemotherapy, immunotherapy, etc.). In still another example, the tumor samples (or suspected tumor samples) may be obtained during the progress of the tumor upon identifying a new metastasized tissues or cells.

From the obtained tumor samples (cells or tissue) or healthy samples (cells or tissue), DNA (e.g., genomic DNA, extrachromosomal DNA, etc.), RNA (e.g., mRNA, miRNA, siRNA, shRNA, etc.), and/or proteins (e.g., membrane protein, cytosolic protein, nucleic protein, etc.) can be isolated and further analyzed to obtain omics data. Alternatively and/or additionally, a step of obtaining omics data may include receiving omics data from a database that stores omics information of one or more patients and/or healthy individuals. For example, omics data of the patient's tumor may be obtained from isolated DNA, RNA, and/or proteins from the patient's tumor tissue, and the obtained omics data may be stored in a database (e.g., cloud database, a server, etc.) with other omics data set of other patients having the same type of tumor or different types of tumor. Omics data obtained from the healthy individual or the matched normal tissue (or normal tissue) of the patient can be also stored in the database such that the relevant data set can be retrieved from the database upon analysis. Likewise, where protein data are obtained, these data may also include protein activity, especially where the protein has enzymatic activity (e.g., polymerase, kinase, hydrolase, lyase, ligase, oxidoreductase, etc.).

As used herein, omics data includes but is not limited to information related to genomics, proteomics, and transcriptomics, as well as specific gene expression or transcript analysis, and other characteristics and biological functions of a cell. With respect to genomics data, suitable genomics data includes DNA sequence analysis information that can be obtained by whole genome sequencing and/or exome sequencing (typically at a coverage depth of at least 10×, more typically at least 20×) of both tumor and matched normal sample. Alternatively, DNA data may also be provided from an already established sequence record (e.g., SAM, BAM, FASTA, FASTQ, or VCF file) from a prior sequence determination. Therefore, data sets may include unprocessed or processed data sets, and exemplary data sets include those having BAM format, SAM format, FASTQ format, or FASTA format. However, it is especially preferred that the data sets are provided in BAM format or as BAMBAM diff objects (e.g., U.S. 2012/0059670A1 and U.S. 2012/0066001A1). Omics data can be derived from whole genome sequencing, exome sequencing, transcriptome sequencing (e.g., RNA-seq), or from gene specific analyses (e.g., PCR, qPCR, hybridization, LCR, etc.). Likewise, computational analysis of the sequence data may be performed in numerous manners. In most preferred methods, however, analysis is performed in silico by location-guided synchronous alignment of tumor and normal samples as, for example, disclosed in U.S. 2012/0059670A1 and U.S. 2012/0066001A1 using BAM files and BAM servers. Such analysis advantageously reduces false positive neoepitopes and significantly reduces demands on memory and computational resources.

Where it is desired to obtain the tumor-specific omics data, numerous manners are deemed suitable for use herein so long as such methods will be able to generate a differential sequence object or other identification of location-specific difference between tumor and matched normal sequences. Exemplary methods include sequence comparison against an external reference sequence (e.g., hg18, or hg19), sequence comparison against an internal reference sequence (e.g., matched normal), and sequence processing against known common mutational patterns (e.g., SNVs). Therefore, contemplated methods and programs to detect mutations between tumor and matched normal, tumor and liquid biopsy, and matched normal and liquid biopsy include iCallSV (URL: github.com/rhshah/iCallSV), VarScan (URL: varscan.sourceforge.net), MuTect (URL: github.com/broadinstitute/mutect), Strelka (URL: github.com/Illumina/strelka), Somatic Sniper (URL: gmt.genome.wustl.edu/somatic-sniper/), and BAMBAM (U.S. 2012/0059670).

However, in especially preferred aspects of the inventive subject matter, the sequence analysis is performed by incremental synchronous alignment of the first sequence data (tumor sample) with the second sequence data (matched normal), for example, using an algorithm as for example, described in *Cancer Res* 2013 Oct. 1; 73(19):6036-45, U.S. 2012/0059670 and U.S. 2012/0066001 to so generate the patient and tumor specific mutation data. As will be readily appreciated, the sequence analysis may also be performed in such methods comparing omics data from the tumor sample and matched normal omics data to so arrive at an analysis that can not only inform a user of mutations that are genuine to the tumor within a patient, but also of mutations that have newly arisen during treatment (e.g., via comparison of matched normal and matched normal/tumor, or via comparison of tumor). In addition, using such algorithms (and especially BAMBAM), allele frequencies and/or clonal populations for specific mutations can be readily determined, which may advantageously provide an indication of treatment success with respect to a specific tumor cell fraction or population. Thus, exemplary subtypes of genomics data may include, but not limited to genome amplification (as represented genomic copy number aberrations), somatic mutations (e.g., point mutation (e.g., nonsense mutation, missense mutation, etc.), deletion, insertion, etc.), genomic rearrangements (e.g., intrachromosomal rearrangement, extrachromosomal rearrangement, translocation, etc.), appearance and copy numbers of extrachromosomal genomes (e.g., double minute chromosome, etc.). In addition, genomic data may also include mutation burden that is measured by the number of mutations carried by the cells or appeared in the cells in the tissue in a predetermined period of time or within a relevant time period.

Moreover, it should be noted that some data sets are preferably reflective of a tumor and a matched normal sample of the same patient to so obtain patient and tumor specific information. In such embodiments, genetic germ line alterations not giving rise to the tumor (e.g., silent mutation, SNP, etc.) can be excluded. Of course, it should be recognized that the tumor sample may be from an initial tumor, from the tumor upon start of treatment, from a recurrent tumor or metastatic site, etc. In most cases, the matched normal sample of the patient may be blood, or non-diseased tissue from the same tissue type as the tumor.

In addition, omics data of cancer and/or normal cells comprises transcriptome data set that includes sequence information and expression level (including expression profiling, copy number, or splice variant analysis) of RNA(s) (preferably cellular mRNAs) that is obtained from the patient, from the cancer tissue (diseased tissue) and/or matched normal tissue of the patient or a healthy individual. There are numerous methods of transcriptomic analysis known in the art, and all of the known methods are deemed suitable for use herein (e.g., RNAseq, RNA hybridization arrays, qPCR, etc.). Consequently, preferred materials include mRNA and primary transcripts (hnRNA), and RNA sequence information may be obtained from reverse transcribed polyA$^+$-RNA, which is in turn obtained from a tumor sample and a matched normal (healthy) sample of the same patient. Likewise, it should be noted that while polyA$^+$-RNA is typically preferred as a representation of the transcriptome, other forms of RNA (hn-RNA, non-polyadenylated RNA, siRNA, miRNA, etc.) are also deemed suitable for use herein. Preferred methods include quantitative RNA (hnRNA or mRNA) analysis and/or quantitative proteomics analysis, especially including RNAseq. In other aspects, RNA quantification and sequencing is performed using RNA-seq, qPCR and/or rtPCR based methods, although various alternative methods (e.g., solid phase hybridization-based methods) are also deemed suitable. Viewed from another perspective, transcriptomic analysis may be suitable (alone or in combination with genomic analysis) to identify and quantify genes having a cancer- and patient-specific mutation.

Preferably, the transcriptomics data set includes allele-specific sequence information and copy number information. In such embodiment, the transcriptomics data set includes all read information of at least a portion of a gene, preferably at least 10×, at least 20×, or at least 30×. Allele-specific copy numbers, more specifically, majority and minority copy numbers, are calculated using a dynamic windowing approach that expands and contracts the window's genomic width according to the coverage in the germline data, as described in detail in U.S. Pat. No. 9,824,181, which is incorporated by reference herein. As used herein, the majority allele is the allele that has majority copy numbers (>50% of total copy numbers (read support) or most copy numbers) and the minority allele is the allele that has minority copy numbers (<50% of total copy numbers (read support) or least copy numbers).

It should be appreciated that one or more desired nucleic acids or genes may be selected for a particular disease (e.g., cancer, etc.), disease stage, specific mutation, or even on the basis of personal mutational profiles or presence of expressed neoepitopes. Alternatively, where discovery or scanning for new mutations or changes in expression of a particular gene is desired, RNAseq is preferred to so cover at least part of a patient transcriptome. Moreover, it should be appreciated that analysis can be performed static or over a time course with repeated sampling to obtain a dynamic picture without the need for biopsy of the tumor or a metastasis.

Further, omics data of cancer and/or normal cells comprises proteomics data set that includes protein expression levels (quantification of protein molecules), post-translational modification, protein-protein interaction, protein-nucleotide interaction, protein-lipid interaction, and so on. Thus, it should also be appreciated that proteomic analysis as presented herein may also include activity determination of selected proteins. Such proteomic analysis can be performed from freshly resected tissue, from frozen or otherwise preserved tissue, and even from FFPE tissue samples. Most preferably, proteomics analysis is quantitative (i.e., provides quantitative information of the expressed polypeptide) and qualitative (i.e., provides numeric or qualitative specified activity of the polypeptide). Any suitable types of analysis are contemplated. However, particularly preferred proteomics methods include antibody-based methods and mass spectroscopic methods. Moreover, it should be noted that the proteomics analysis may not only provide qualitative or quantitative information about the protein per se, but may also include protein activity data where the protein has catalytic or other functional activity. One exemplary technique for conducting proteomic assays is described in U.S. Pat. No. 7473532, incorporated by reference herein. Further suitable methods of identification and even quantification of protein expression include various mass spectroscopic analyses (e.g., selective reaction monitoring (SRM), multiple reaction monitoring (MRM), and consecutive reaction monitoring (CRM)).

Identification of Neoepitopes of Tumor Cells

With respect to neoepitopes, it should be appreciated that neoepitopes can be viewed as expressed random mutations or intron retention (that behaves similar to an insertion mutation) in tumor cells that created unique and tumor specific antigens. Therefore, viewed from a different perspective, neoepitopes may be identified by considering the type (e.g., deletion, insertion, transversion, transition, translocation, intron retention) and impact of the mutation (e.g., non-sense, missense, frame shift, etc.), which may as such serve as a first content filter through which silent and other non-relevant (e.g., non-expressed) mutations are eliminated. It should further be appreciated that neoepitope sequences can be defined as sequence stretches with relatively short length (e.g., 7-11 mers) wherein such stretches will include the change(s) in the amino acid sequences. Most typically, the changed amino acid will be at or near the central amino acid position. For example, a typical neoepitope may have the structure of $A_4$-N-$A_4$, or $A_3$-N-$A_5$, or $A_2$-N-$A_7$, or $A_5$-N-$A_3$, or $A_7$-N-$A_2$, where A is a proteinogenic amino acid and N is a changed amino acid (relative to wild type or relative to matched normal). For example, neoepitope sequences as contemplated herein include sequence stretches with relatively short length (e.g., 5-30 mers, more typically 7-11 mers, or 12-25 mers) wherein such stretches include the change(s) in the amino acid sequences.

Thus, it should be appreciated that a single amino acid change may be presented in numerous neoepitope sequences that include the changed amino acid, depending on the position of the changed amino acid. Advantageously, such sequence variability allows for multiple choices of neoepitopes and so increases the number of potentially useful targets that can then be selected on the basis of one or more desirable traits (e.g., highest affinity to a patient HLA-type, highest structural stability, etc.). Most typically, such neoepitopes will be calculated to have a length of between 2-50 amino acids, more typically between 5-30 amino acids, and most typically between 9-15 amino acids, with a changed amino acid preferably centrally located or otherwise situated in a manner that allows for or improves its binding to MHC. For example, where the epitope is to be presented by the MHC-I complex, a typical neoepitope length will be about 8-11 amino acids, while the typical neoepitope length for presentation via MHC-II complex will have a length of about 13-17 amino acids. As will be readily appreciated, since the position of the changed amino acid in the neoepitope may be other than central, the actual peptide sequence and with that actual topology of the neoepitope may vary considerably.

Of course, it should be appreciated that the identification or discovery of neoepitopes may start with a variety of biological materials, including fresh biopsies, frozen or otherwise preserved tissue or cell samples, circulating tumor cells, exosomes, various body fluids (and especially blood), etc. as is further discussed in more detail below. Thus, suitable methods of omics analysis include nucleic acid sequencing, and particularly NGS methods operating on DNA (e.g., Illumina sequencing, ion torrent sequencing, 454 pyrosequencing, nanopore sequencing, etc.), RNA sequencing (e.g., RNAseq, reverse transcription based sequencing, etc.), and protein sequencing or mass spectroscopy based sequencing (e.g., SRM, MRM, CRM, etc.).

As such, and particularly for nucleic acid based sequencing, it should be particularly recognized that high-throughput genome sequencing of a tumor tissue will allow for rapid identification of neoepitopes. However, it must be appreciated that where the so obtained sequence information is compared against a standard reference, the normally occurring inter-patient variation (e.g., due to SNPs, short indels, different number of repeats, etc.) as well as heterozygosity will result in a relatively large number of potential false positive neoepitopes. Notably, such inaccuracies can be eliminated where a tumor sample of a patient is compared against a matched normal (i.e., non-tumor) sample of the same patient.

In one especially preferred aspect of the inventive subject matter, DNA analysis is performed by whole genome sequencing and/or exome sequencing (typically at a coverage depth of at least 10×, more typically at least 20×) of both tumor and matched normal sample. Alternatively, DNA data may also be provided from an already established sequence record (e.g., SAM, BAM, FASTA, FASTQ, or VCF file) from a prior sequence determination. Therefore, data sets may include unprocessed or processed data sets, and exemplary data sets include those having BAMBAM format, SAMBAM format, FASTQ format, or FASTA format. However, it is especially preferred that the data sets are provided in BAMBAM format or as BAMBAM diff objects (see e.g., U.S. 2012/0059670A1 and U.S. 2012/0066001A1). Moreover, it should be noted that the data sets are reflective of a tumor and a matched normal sample of the same patient to so obtain patient and tumor specific information. Thus, genetic germ line alterations not giving rise to the tumor (e.g., silent mutation, SNP, etc.) can be excluded. Of course, and addressed in more detail below, it should be recognized that the tumor sample may be from an initial tumor, from the tumor upon start of treatment, from a recurrent tumor or metastatic site, etc. In most cases, the matched normal sample of the patient may be blood, or non-diseased tissue from the same tissue type as the tumor.

Of course, it should be noted that the computational analysis of the sequence data may be performed in numerous manners. In most preferred methods, however, analysis is performed in silico by location-guided synchronous alignment of tumor and normal samples as, for example, disclosed in U.S. 2012/0059670A1 and U.S. 2012/0066001A1 using BAM files and BAM servers. Such analysis advantageously reduces false positive neoepitopes and significantly reduces demands on memory and computational resources.

Additionally, it should be appreciated that the analysis may also be performed in a manner where the matched normal sequence data are replaced with tumor sequence data from a different point in time and/or a different location. Thus, analysis of a tumor may not only be performed in a manner that compared tumor sequence information with matched normal sequence information, but also in a manner that allows detection of differential mutations in a tumor at one location over time (e.g., primary tumor before and after first round of treatment) or in a primary tumor versus other location (e.g., primary tumor versus distant metastasis). Thus, genetic drift and with that neoepitope drift can be identified and treatment can be readily adapted. Moreover, the effect of a prior round of treatment can be correlated with the presence or absence of neoepitopes, which may be used as molecular proxy markers for efficacy of treatment. For example, immunotherapy using a first neoepitope may result in the eradication of a tumor cell population or clone expressing that neoepitope while treatment resistant claims with new neoepitopes may be readily identified and followed. Viewed from a different perspective, differential neoepitope analysis from biopsy data of the same patient may not only be useful for generation of a new immunotherapeutic, but also for tracking and evaluation of prior treatment.

Identification of HLA type and Tumor-Specific Changes in HLA Expression

Any suitable methods to determine the HLA type of the patient are contemplated including any wet chemistry methods including reverse Sequence Specific Oligonucleotide (rSSO) and Sequence Based Typing (SBT), or any in silico analysis of genomics data. Most typically, suitable HLA-type determinations include at least three MHC-I sub-types (e.g., HLA-A, HLA-B, HLA-C) and at least one, or two, or three MHC-II sub-types (e.g., HLA-DP, HLA-DQ, HLA-DR). Preferably each subtype will be determined to at least 4-digit depth. However, greater depth (e.g., 6 digit, 8 digit) is also contemplated herein.

In especially preferred methods, the HLA-type can be predicted from the patient's omics data obtained from a matched normal tissue in silico using a reference sequence containing most or all of the known and/or common HLA-types. For example, in one exemplary method, a relatively large number of patient sequence reads (obtained from a matched normal tissue) mapping to chromosome 6p21.3 (or any other location near/at which HLA alleles are found) is provided by a database or sequencing machine. Most typically the sequence reads will have a length of about 100-300 bases and comprise metadata, including read quality, alignment information, orientation, location, etc. For example, suitable formats include SAM, BAM, FASTA, GAR, etc. While not limiting to the inventive subject matter, it is generally preferred that the patient sequence reads provide a depth of coverage of at least 5×, more typically at least 10×, even more typically at least 20×, and most typically at least 30×.

In addition to the patient sequence reads, contemplated methods further employ one or more reference sequences that include a plurality of sequences of known and distinct HLA alleles. For example, a typical reference sequence may be a synthetic (without corresponding human or other mammalian counterpart) sequence that includes sequence segments of at least one HLA-type with multiple HLA-alleles of that HLA-type. For example, suitable reference sequences include a collection of known genomic sequences for at least 50 different alleles of HLA-A. Alternatively, or additionally, the reference sequence may also include a collection of known RNA sequences for at least 50 different alleles of HLA-A. Of course, the reference sequence is not limited to 50 alleles of HLA-A, but may have alternative composition with respect to HLA-type and number/composition of alleles. Most typically, the reference sequence will be in a computer readable format and will be provided from a database or other data storage device. For example, suitable reference sequence formats include FASTA, FASTQ, EMBL, GCG, or GenBank format, and may be directly obtained or built from data of a public data repository (e.g., IMGT, the International ImMunoGeneTics information system, or The Allele Frequency Net Database, EUROSTAM, URL: www.allelefrequencies.net). Alternatively, the reference sequence may also be built from individual known HLA-alleles based on one or more predetermined criteria such as allele frequency, ethnic allele distribution, common or rare allele types, etc.

Using the reference sequence, the patient sequence reads can now be threaded through a de Bruijn graph to identify the alleles with the best fit. In this context, it should be noted that each individual carries two alleles for each HLA-type, and that these alleles may be very similar, or in some cases even identical. Such high degree of similarity poses a significant problem for traditional alignment schemes. The inventor has now discovered that the HLA alleles, and even very closely related alleles can be resolved using an approach in which the de Bruijn graph is constructed by decomposing a sequence read into relatively small k-mers (typically having a length of between 10-20 bases), and by implementing a weighted vote process in which each patient sequence read provides a vote ("quantitative read support") for each of the alleles on the basis of k-mers of that sequence read that match the sequence of the allele. The cumulatively highest vote for an allele then indicates the most likely predicted HLA allele. In addition, it is generally preferred that each fragment that is a match to the allele is also used to calculate the overall coverage and depth of coverage for that allele.

Scoring may further be improved or refined as needed, especially where many of the top hits are similar (e.g., where a significant portion of their score comes from a highly shared set of k-mers). For example, score refinement may include a weighting scheme in which alleles that are substantially similar (e.g., >99%, or other predetermined value) to the current top hit are removed from future consideration. Counts for k-mers used by the current top hit are then re-weighted by a factor (e.g., 0.5), and the scores for each HLA allele are recalculated by summing these weighted counts. This selection process is repeated to find a new top hit. The accuracy of the method can be even further improved using RNA sequence data that allows identification of the alleles expressed by a tumor, which may sometimes be just 1 of the 2 alleles present in the DNA. In further advantageous aspects of contemplated systems and methods, DNA or RNA, or a combination of both DNA and RNA can be processed to make HLA predictions that are highly accurate and can be derived from tumor or blood DNA or RNA. Further aspects, suitable methods and considerations for high-accuracy in silico HLA typing are described in International Application Publication WO 2017/035392, incorporated by reference herein.

The inventors further contemplate that the sequence reads obtained from a tumor tissue of the patient can be compared with the sequence reads obtained from the matched normal tissue of the patient to identify a mutation in the HLA type of the tumor tissue. In a preferred embodiment, a relatively large number of patient sequence reads (obtained from a tumor tissue of the patient) mapping to chromosome 6p21.3 (or any other location near/at which HLA alleles are found) is provided by a database or sequencing machine. Similar to the sequence reads obtained from the matched normal tissue, the sequence reads will have a length of about 100-300 bases and comprise metadata, including read quality, alignment information, orientation, location, etc. For example, suitable formats include SAM, BAM, FASTA, GAR, etc. While not limiting to the inventive subject matter, it is generally preferred that the patient sequence reads provide a depth of coverage of at least 5×, more typically at least 10×, even more typically at least 20×, and most typically at least 30×.

Such obtained sequence reads from the tumor tissue is then aligned with the reference sequence and the sequence reads from the matched normal tissue by local alignment, using incremental synchronization on a position-by-position basis, to compare the nucleic acid sequences of the sequence reads and identify any unmatched sequence in the tumor sequence reads compared to the matched normal tissue reads. In some embodiments, in order to reduce a false positive call for a mutated sequence, any base change in tumor sequence reads having read support at least 2 times (two reads indicating the same change for that position) against the matched normal tissue reads or reference sequence can be recorded as a 'mutation'.

From the sequence data obtained from the comparison can be used to identify the type of mutation that may affect the amino acid sequence and/or the structure of the HLA protein, which in turn, may affect the function of the HLA protein. For example, a mutation in the binding grove of the HLA protein may reduce the affinity to the antigen coupled to the HLA or even lose the binding to the antigen such that the antigen cannot be presented to the cell surface with the mutated HLA protein. In another example, a mutation in the cell surface trafficking signal (e.g., C-terminus tail of some HLA molecules, e.g., HLA-C) may decrease or even abolish the cell surface expression of the HLA molecule on the tumor cell such that any antigen coupled to such mutated HLA molecule would be accumulated in cytosolic compartments. In still another example, a mutation that generates unstable (e.g., prone to degenerate or degrade) transcript, immature peptide of HLA protein, or misfolded peptide of HLA protein may reduce or even abolish the overall expression level of mutated HLA protein such that the antigen cannot be sufficiently and/or competently presented on the cell surface of the tumor cell. In some embodiments, one or more those effects can be directly inferred from the DNA or RNA sequence information that encodes an HLA protein (e.g., nonsense mutation that is predicted to generate non-functional peptide, or a deletion or addition mutation that is predicted generate a peptide that has different amino acid sequence in more than 40%, more than 50%, more than 60% along the length of the peptide, etc.). In other embodiments, one or more those effects can be inferred from prediction of the protein structure from the DNA or RNA sequence of the mutated HLA gene. Any suitable prediction algorithms to predict the protein structure can be used, and the exemplary algorithm may include threading and comparative modeling methods that use detectable similarity spanning most of the modeled sequence and at least one known structure, and/or de novo or ab initio methods, which predict the structure from sequence alone, without relying on similarity upon protein folding between the modeled sequence and any of the known structures.

In addition to the genomics data analysis, or alternatively, transcriptomics data, especially the RNA expression level data, can be used to identify any change in the HLA expression of the tumor tissue. For example, any upregulation or downregulation of HLA transcripts, especially the allele-specific transcript, can change the population of HLA molecules available to load the antigen to present on the surface of the tumor cell. Further, proteomics data can be also used to identify or infer any change in the HLA type of the tumor tissue. For example, any upregulated expression of RNA-binding molecule that may bind to HLA-encoding RNA molecule to facilitate degradation or destabilization of the HLA-encoding RNA molecule can indicate the loss or low availability of HLA-encoding RNA molecule to load the antigen.

Consequently, the inventors further contemplate that a surface presentation level of the neoepitope coupled with the HLA molecule can be predicted from the genomics, transcriptomics and/or proteomics data analysis on HLA type, HLA-mutation, any changes of HLA-type, and/or the sequence of identified neoepitope. For example, based on the mutation (e.g., deletion, frameshift mutation, etc.) of the HLA type in the tumor cell or changes in the transcript or protein-protein interaction of the HLA molecule, the surface expression of the HLA molecule itself in the tumor cell may be decreased at least 10%, at least 20%, at least 50%, at least 70%, or even almost entirely abolished. In such example, it can be assumed that even if the mutation does not directly affect the binding affinity of the HLA molecule to the neoepitope, neoepitope presentation the cell surface can be equally or even more reduced in the tumor cell compared to the matched normal cells.

In another example, some mutations in the HLA molecule in the tumor cell may not substantially affect the surface expression of the HLA molecule itself, yet may prevent the neoepitope presentation on the cell surface by reducing the binding affinity of the HLA molecule to the neoepitope. Thus, in one embodiment, the identified neoepitope can be subject to detailed analysis for sub-cellular location parameters. For example, neoepitope sequences may be selected for further consideration if the neoepitopes are identified as having a membrane associated location (e.g., are located at the outside of a cell membrane of a cell) and/or if an in silico structural calculation confirms that the neoepitope is likely to be solvent exposed, or presents a structurally stable epitope (e.g., *J Exp Med* 2014), etc. In addition, the identified neoepitope can be further filtered to determine whether such neoepitope can be actually expressed in the cell or not. In such embodiment, identification of expression and expression level of a neoepitope can be performed in all manners known in the art and preferred methods include quantitative RNA (hnRNA or mRNA) analysis and/or quantitative proteomics analysis. Most typically, the threshold level for inclusion of neoepitopes will be an expression level of at least 20%, at least 30%, at least 40%, or at least 50% of expression level of the corresponding matched normal sequence, thus ensuring that the (neo)epitope is at least potentially 'visible' to the immune system. Consequently, it is generally preferred that the omics analysis also includes an analysis of gene expression (transcriptomic analysis) to so help identify the level of expression for the gene with a mutation. Similarly, proteomics analysis can be performed in numerous manners to ascertain actual translation of the RNA of the neoepitope, and all known manners of proteomics analysis are contemplated herein. However, particularly preferred proteomics methods include antibody-based methods and mass spectroscopic methods. Moreover, it should be noted that the proteomics analysis may not only provide qualitative or quantitative information about the protein per se, but may also include protein activity data where the protein has catalytic or other functional activity.

Such selected neoepitopes can be further filtered based on the binding affinity to the HLA molecule in the tumor cell. Generally, for a HLA-type of the matched normal tissue, a structural solution for the HLA-type can be calculated or obtained from a database, which is then used in a docking model in silico to determine binding affinity of the (typically filtered) neoepitope to the HLA structural solution. An exemplary, suitable systems for determination of binding affinities include the NetMHC platform (see e.g., *Nucleic Acids Res.* 2008 Jul. 1; 36(Web Server issue): W509-W512.). Thus, in some embodiments, a binding affinity of a neoepitope to a mutated HLA-type of the tumor tissue can be predicted by calculating the binding affinity of the neoepitope to the HLA-type of the matched normal tissue, and further predicting a change in the binding affinity upon the mutation of the HLA-type of the tumor tissue. For example, a missense mutation in a grove portion of the HLA molecule may decrease the affinity to the neoepitope based on the changed amino acid sequence and the location of the missense mutation in the grove, and a change in standard binding free energy upon mutations can be calculated. Any suitable methods to calculate the binding free energy are contemplated, and exemplary methods includes those disclosed in Li et al. (*J. Chem. Theory Comput.*, 2014, 10 (4), pp 1770-1780) and Witvliet et al. (*Bioinformatics*, Volume 32, Issue 10, 15 May 2016, Pages 1589-1591). Preferably, using such analysis, neoepitopes with high affinity to HLA-type of the tumor cell (e.g., less than 100 nM, less than 75 nM, less than 50 nM) can be selected as a candidate neoepitope with high likelihood of surface presentation on the tumor cell.

The inventors contemplate that an immunogenicity of a neoepitope is likely to be proportional, or at least partially dependent on the surface presentation level of the neoepitope coupled with the tumor HLA molecule. From a different perspective, the inventors further contemplate that an immunotherapeutic composition using such neoepitope would have more likelihood of success if the predicted surface presentation level of the neoepitope is high. Thus, in some embodiments, the surface presentation level of the neoepitope can be calculated and/or predicted considering any changes of tumor HLA genes/molecule that affects surface expression of HLA molecule itself and the affinity of the neoepitope of the tumor HLA molecule. For example, where the mutation in the tumor HLA gene is expected to downregulate the transcription of the HLA gene for at least 30%, and such mutation also decreases the affinity of the neoepitope to the mutated HLA molecule for at least 20%. In such example, it is expected that the surface presentation of the neoepitope coupled with the tumor HLA molecule is decreased at least 44% (70%×80% surface expression) compared to a scenario that the tumor cell express normal HLA molecule (unmutated) and the neoepitope.

Consequently, a subset of neoepitopes can be selected for generating an immunotherapeutic composition. Preferably, the subset of neoepitope is selected when the neoepitopes are expected to be presented on the surface. Thus, in some embodiments, the subset of neoepitope is selected when the predicted surface presentation level is higher than a predetermined threshold. The predetermined threshold may vary depending on the type of HLA, tumor types, types of immunotherapeutic composition, and/or neoepitopes. Thus, the predetermined threshold may be an absolute value (e.g., predicted to express at least 10, at least 50, at least 100 HLA-neoepitope complex molecule on the surface of a single tumor cell, etc.) or a relative value (e.g., predicted to express at least 50%, at least 60%, at least 70%, at least 80%, at least 90% expression level on the surface of a single tumor cell compared to expected the surface presentation level of normal HLA and neoepitope complex, etc.).

As will be readily appreciated, suitable immunotherapeutic compositions include recombinant (e.g., naked DNA, RNA, viral, bacterial) expression system that encode the treatment relevant neoepitopes, a recombinant immune competent cell (e.g., NK cell, T cell, dendritic cell) expressing the treatment relevant neoepitopes, a recombinant immune competent cell expressing a (chimeric) receptor for the treatment relevant neoepitopes (e.g., T cell expressing CAR), a synthetic antibody for binding the treatment relevant neoepitopes, and a population of white blood cells ex vivo activated with the treatment relevant neoepitopes.

For example, upon selection of treatment relevant neoepitopes, a recombinant nucleic acid can be constructed for intracellular expression and subsequent presentation of the neoepitopes on the cell. The recombinant nucleic acid comprises sequence portions that encode one or more patient- and cancer-specific neoepitopes in an arrangement such that the neoepitope is directed to MHC-I and/or MHC-II presentation pathways and MHC sub-type(s) for which the neoepitope is known to have high affinity. Such targeted and rational-based presentation is thought to produce a more robust immune response, which may be further augmented by subcutaneous delivery or more typically expression of one or more co-stimulatory molecules and/or checkpoint inhibitors. Of course, it should be appreciated that all manners of delivery of such recombinant nucleic acid(s) are deemed suitable and that the recombinant nucleic acid(s) may be formulated as a DNA vaccine, as a recombinant viral genome, or a DNA or RNA deliverable in a transfection composition. Therefore, it is noted that all expression systems known in the art are deemed suitable for use herein (e.g., bacterial expression systems, yeast expression systems, 'naked' DNA and RNA expression systems).

However, it is especially preferred to use viruses already established in gene therapy, including adenoviruses, adeno-associated viruses, alphaviruses, herpes viruses, lentiviruses, etc. However, among other appropriate choices, adenoviruses are particularly preferred. Moreover, it is further generally preferred that the virus is a replication deficient and non-immunogenic virus, which is typically accomplished by targeted deletion of selected viral proteins (e.g., E1, E3 proteins). Such desirable properties may be further enhanced by deleting E2b gene function, and high titers of recombinant viruses can be achieved using genetically modified human 293 cells as has been recently reported (e.g., *J Virol* 1998 Feb; 72(2): 926-933). Most typically, the desired nucleic acid sequences (for expression from virus infected cells) are under the control of appropriate regulatory elements well known in the art.

With respect to the integration of sequence portions that encode the neoepitopes it should be noted that the various neoepitopes may be arranged in numerous manners, and that a transcription or translation unit may have concatemeric arrangement of multiple epitopes, typically separated by short linkers (e.g., flexible linkers having between 4 and 20 amino acids), which may further include protease cleavage sites. Such concatemers may include between 1 and 20 neoepitopes (typically limited by size of recombinant nucleic acid that can be delivered via a virus), and it should be noted that the concatemers may be identical for delivery to the MHC-I and MHC-II complex, or different. Therefore, and as noted below, it should be appreciated that various peptides can be routed to specific cellular compartments to so achieve preferential or even specific presentation via MHC-I and/or MHC-II. Viewed from another perspective, it should be recognized that tumor associated antigens and neoepitopes may be presented via both presentation pathways, or selectively to one or another pathway at the same time or in subsequent rounds of treatment.

With respect to the 'payload' of the genetically modified virus it is contemplated that expression of more than one treatment relevant neoepitope is preferred, for example two, three, four, five, and even more, which can be accomplished using multiple distinct modified viruses, or a virus having more than one neoepitope sequence (e.g., as concatemeric or chimeric sequence). While not limiting to the inventive subject matter, it is generally preferred that neoepitope sequences are configured as a tandem minigene (e.g., $aa_{12}$-$neoepitope_{12}$-$aa_{12}$), or as single transcriptional unit, which may or may not be translated to a chimeric protein. Thus, it should be appreciated that the epitopes can be presented as monomers, multimers, individually or concatemeric, or as hybrid sequences with N- and/or C-terminal peptides. Most typically, it is preferred that the nucleic acid sequence is back-translated using suitable codon usage to accommodate the virus and/or host codon preference. However, alternate codon usage or non-matched codon usage is also deemed appropriate. With respect to further suitable configurations and expression cassettes reference is made to co-pending U.S. provisional application Ser. No. 62/302168, filed Mar. 2, 2016, and the Ser. No. 62/314366, filed Mar. 28, 2016, incorporated by reference herein.

In further contemplated aspects, immunotherapeutic compositions may also include one or more of the treatment relevant neoepitopes, typically prepared as a synthetic peptide. There are numerous methods known in the art to prepare synthetic peptides, and all known manners are deemed suitable for use herein. For example, peptides with cancer neoepitope sequences can be prepared on a solid phase (e.g., using Merrifield synthesis), via liquid phase synthesis, or from smaller peptide fragments. In less preferred aspects, peptides could also be produced by expression of a recombinant nucleic acid in a suitable host (especially where multiple treatment relevant neoepitopes are on a single peptide chain, optionally with spacers between neoepitopes or cleavage sites).

Therefore, the structure of the synthetic peptides corresponding to or comprising the treatment relevant neoepitope sequences may be $X$-$L_1$-$(A_n$-$L_2)_m$-$Q$, in which X is an optional coupling group or moiety that is suitable to covalently or non-covalently attaches the synthetic peptide to a solid phase, $L_1$ is an optional linker that covalently links the synthetic peptide to a solid phase or the coupling group. $A_n$ is the synthetic peptide having the neoepitope sequence with A being a natural (proteinogenic) amino acid and n is an integer between 7 and 30, and most typically between 7 and 11 or 15-25. $L_2$ is an optional linker that may be present, especially where multiple synthetic peptide sequences (identical or different) are in the construct, and m is an integer, typically between 1 and 30, and most typically between 2 and 15. Finally, Q is a terminal group which may used to couple the end of the synthetic peptide to the solid phase (e.g., to sterically constrain the peptide) or to a reporter group (e.g., fluorescence marker) or other functional moiety (e.g., affinity marker). Consequently, it should be noted that where the synthetic peptide is used for direct MHC-I binding, the overall length will be between 8 and 10 amino acids. Similarly, where the synthetic peptide is used for direct MHC-II binding, the overall length will be between 14 and 20 amino acids. On the other hand, where the synthetic peptide is processed in the cell (typically via proteasome processing) prior to MHC presentation, the overall length will typically be between 10 and 40 amino acids, with the changed amino at or near a central position in the synthetic peptide.

For example, X could be a non-covalent affinity moiety (e.g., biotin) that binds a corresponding binding agent (e.g., avidin) on the solid phase, or a chemical group (with or without spacer) that reacts with the N- or C-terminal amino or carboxyl group of the peptide, or a selectively reactive group (e.g., iodoacetyl or maleimide group) that reacts with a sulfhydryl group in the peptide or linker $L_1$. $L_1$ may be used to increase the distance of the synthetic peptide from the solid phase and will therefore typically comprise a flexible linear moiety (e.g., comprising glycol groups, alkoxy groups, glycine, etc.) having a length of equivalent to between about 2-20 carbon-carbon bonds (e.g., between 0.3 nm and 3 nm). Of course, it should also be appreciated that the synthetic peptide may use the solid phase on which the peptide was produced and as such not require a separate coupling group or linker.

Computation based methods may be used for predicting MHC-peptide binding affinity. In preferred embodiments, such computation based methods would include obtaining a plurality of training peptide sequences; configuring a neural network model to be trained to predict major histocompatibility complex (MHC)-peptide binding affinity using the plurality of training peptide sequences, wherein configuring the neural network model comprises configuring an encoder of the neural network model comprising a recurrent neural network (RNN) to process an input training peptide sequence to generate a fixed dimension encoding output by applying a final hidden state of the RNN at intermediate state outputs of the RNN to generate attention weighted outputs, and linearly combining the attention weighted outputs; training the neural network model using the plurality of training peptide sequences; and configuring a computing device to use the trained neural network model to predict MHC-peptide binding affinity for a test peptide sequence. This method is disclosed in PCT/US2019/046582 and incorporated by reference herein in its entirety.

Depending on the particular synthetic peptide and coupling method, it should be appreciated that the nature of the solid phase may vary considerably, and all known solid phases for attachment of peptides are deemed suitable for use herein. For example, suitable solid phases include agarose beads, polymer beads (colored or otherwise individually addressable), wall surfaces of a well in a microtiter plate, paper, nitrocellulose, glass, etc. The person of ordinary skill in the art will be readily appraised of a suitable choice of solid phase and attachment chemistry. In further preferred aspects, it is also noted that the solid phase will generally be suitable for protocols associated with phage display methods such as to allow peptides presented on a phage (or other scaffold carrier) to reversibly bind to the solid phase via the synthetic peptide. In still further contemplated uses, it should also be recognized that the solid phase may be a carrier protein used in vaccination (e.g., albumin, KLH, tetanus toxoid, diphtheria toxin, etc.), particularly where the synthetic protein is used as a vaccine in a mammal or as an immunogenic compound in a non-human mammal for antibody production. Likewise, the synthetic protein may also be used as a vaccine or immunogenic compound without any carrier.

To obtain a synthetic antibody against the relevant neoepitope(s), it is contemplated that the in silico identified sequence of the neoepitope is prepared in vitro to yield a synthetic peptide. In still further preferred methods, it should be recognized that where the synthetic peptide (that comprises or corresponds to the cancer neoepitope) is immobilized on a solid phase, affinity agents, and particularly antibodies, to the neoepitope may be isolated and/or refined. Most preferably, such isolation will include a prefabricated high-diversity library of antibodies. As used herein, and unless the context dictates otherwise, the term "antibody" or "antibodies" includes all isotypes and subtypes of antibodies (e.g., IgG, IgM, IgE, etc.) as well as all fragments thereof, including monovalent IgG, F(ab')$_2$, Fab', Fab, scFv, scFv-Fc, VhH, etc. Moreover, contemplated antibodies may be humanized, of human or non-human (e.g., rodent) origin, or may be chimeric. In a typical method, a high-diversity library may be a phage display library having a diversity of at least $10^9$ diverse members, or at least $10^{10}$ diverse members, or even higher, typically based on M13 phages and display via pIII, pVIII, pVI, or pIX, or based on T7 phages and the gene 10 capsid protein. As should be readily appreciated, use of large diversity libraries will provide in relatively short time several binding candidate antibodies that can be further selected for best binders. Indeed, where binding affinity to the immobilized synthetic peptide is less than desired, it should be recognized that affinity can be improved via affinity maturation using protocols well known in the art. For example, low affinity ($K_D>10^{-7}$M) binders or members of smaller libraries may be subjected to affinity maturation to improve binding affinity and/or kinetic using methods well known in the art (see e.g., *Briefings In Functional Genomics And Proteomics*. Vol 1. No. 2. 189-203. July 2002). In addition, it should be noted that while antibody libraries are generally preferred, other scaffolds are also deemed suitable and include beta barrels, ribosome display, cell surface display, etc. (see e.g., *Protein Sci.* 2006 January; 15(1): 14-27.) Thus, it should be appreciated that in preferred aspects the synthetic peptide is used as a bait in a library of antibodies to so identify high-affinity binding ($K_D<10^{-7}$M, and more typically $K_D<10^{-8}$M) antibodies.

As the antibodies are directly coupled to the cell that carries the nucleic acid encoding these antibodies, it should be further appreciated that such nucleic acid can then be analyzed to identify sequence elements encoding the hypervariable loops, the CDR1, CDR2, and CDR3, for light and heavy chain, respectively, and/or SDRs (specificity determining residues). Most typically, determination is performed using standard sequencing methods. Once determined, it is then contemplated that the hypervariable loops, or the CDR1-H, CDR2-H, and/or CDR3-H and/or the CDR1-L, CDR2-L, and/or CDR3-L, and/or SDRs are grafted onto a human or humanized antibody scaffold or antibody. As will be readily appreciated, grafting can be done by genetic engineering of a nucleic acid that encodes the human or humanized antibody scaffold or antibody. For example, within each CDR, there are more variable positions that are directly involved in the interaction with antigen, i.e., specificity-determining residues (SDRs), whereas there are more conserved residues that maintain the conformations of CDRs loops. SDRs may be identified from the 3D structure of the antigen-antibody complex and/or the mutational analysis of the CDRs. An SDR-grafted humanized antibody is constructed by grafting the SDRs and the residues maintaining the conformations of the CDRs onto human template. Consequently, it should be recognized that human or humanized antibodies with specificity to cancer neoepitopes can be prepared in an entirely synthetic manner in which the antibody is expressed in a cell that has not previously contacted the antigen. Moreover, contemplated methods allow production of patient and cancer specific antibodies for treatment of a patient that has failed to produce or effectively use antibodies against the treatment relevant neoepitopes.

While not limiting to the inventive subject matter, so prepared synthetic antibodies can be used directly as an IgG (or other isotype), as a fragment (e.g., bispecific Fab or other bispecific fragment), and/or as a chimeric protein (e.g., scFv as ectodomain in a chimeric T cell receptor), alone or in conjugation with a therapeutic or diagnostic agent, and/or as a hybrid protein with a transmembrane domain to ensure membrane anchoring of the antibody to a cell. Thus, the inventors contemplate a method of generating an immunotherapeutic composition for cancer immune therapy in which the so identified synthetic antibodies are coupled to a therapeutic or diagnostic agent (which may have a cellular or non-cellular component) to so obtain the immunotherapeutic composition.

Regardless of the particular type of the immunotherapeutic composition, it should be recognized that the determination of treatment relevant neoepitopes can be iteratively done after first and/or successive rounds of treatment (which may include surgery, immunotherapy, radiation, chemotherapy, etc.). Most typically, the so obtained info on the newly identified treatment relevant neoepitopes may be used in further immunotherapy (e.g., recombinant adenovirus, or synthetic antibodies, possibly in combination with modified NK cells, all optionally in conjunction with checkpoint inhibitors). Moreover, it is generally contemplated that where immunotherapy is employed, conventional chemotherapy treatment may be performed at a relatively low dose to support or maintain immune function. For example chemotherapy may be performed using a low-dose regime (e.g., between 0.1% and 1%, or 1% and 5%, or 5% and 10%, or 10% and 20%, or higher but less than 50%, or less than 60% or less than 75% of conventional (see prescribing info) dosage).

Duration of treatment cycles comprising immunotherapy and/or chemotherapy (or other therapeutic interventions) will typically depend on the type and stage of cancer, the type of drug, and/or health of the patient, and it should be appreciated that multiple rounds of administrations of drugs may required that are separated by hours to days or even weeks. Thus, treatment cycles will typically last at least one day, more typically at least one week, even more typically at least 4 weeks, most typically at least 6 weeks. Viewed from a different perspective, the duration of a treatment cycle may be between 1 week and 1 month, between 1 month and 3 moths, or between 6 weeks and 6 months, or even longer (e.g., until remission, or other diagnostic end point). Upon conclusion of a treatment cycle, a traditional evaluation (e.g., using radiographic, hematologic, or other test) is typically performed and will be complemented by at least one new set of biopsies, typically including at least some of the same locations as in the first or prior round. Of course, as needed, new locations may also be sampled. Where a therapy has been effective, and where the primary tumor and/or metastases are undetectable or unsuitable for biopsy, it is contemplated that circulating tumor cells (CTC) or microvesicles or exosomes may be isolated and analyzed for further omics information to evaluate treatment progress and/or efficacy. For example, the treatment may be effective to halt metastases and CTC, but not growth of the primary tumor; or treatment may be effective for the primary tumor but not for all or some metastases. Depending on the outcome of the evaluation and/or omics information, immunotherapy or chemotherapy may be adapted accordingly. For example, new sets of neoepitopes may be targeted where prior epitopes persist. A change in omics data may be indicative of an evolutionary shift in a population of cancer cells, and a shift to a specific cell or epitope population may indicate suitability of particular treatment or exclude other treatment options.

For example, a new round of immunotherapy and/or chemotherapy is performed as, or in a similar fashion as the initial or previous round, and will be informed by the determined first and/or second (and/or subsequent) set of treatment relevant neoepitopes. Therefore, the second round of treatment will typically be different from first in terms of treatment relevant neoepitopes, but may also be different in terms of the type of treatment (e.g., using a different adenovirus, a different set of antibodies or synbodies, or use of different NK cells (e.g., NK-92 modified cells carrying antibodies against neoepitopes, etc.)). It is thus contemplated that subsequent rounds of biopsies and further modified or otherwise adapted immunotherapy or chemotherapy will help reduce or maintain cancer growth or eliminate the tumor altogether. Alternatively or additionally, antibodies against neoepitopes may be used as targeting entities using NK cells, and especially NK-92 cells (that may be further modified to exhibit a high affinity Fc-cell receptor). In further contemplated aspects of the inventive subject matter, the antibody fragment or antibody may also be bound to a T-cell, and especially to a NK-cell to so stimulate and direct an immune response to the cells displaying the neoepitope. Consequently, it should be recognized that an effective immune response against a cancer neoepitope may be elicited using a process that does not require immunization in the patient or other organism, reducing dramatically response time and availability of therapeutic antibodies.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Moreover, all methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of treating a human patient diagnosed with a tumor specific HLA mutation, comprising:

obtaining respective omics data from a tumor cell of a collected tumor sample and a matched normal cell of a collected matched normal sample of the patient, wherein the omics data comprises whole genome DNA sequencing data, exome DNA sequencing data, and/or transcriptomics data;

determining, from the omics data of the matched normal cell, a normal human leukocyte antigen (HLA) molecule of the patient;

identifying a patient-and tumor-specific HLA mutation and a patient-and tumor-specific neoepitope of the tumor cell by comparing the omics data, wherein the patient-and tumor-specific HLA mutation results in a mutated HLA molecule that is different from the normal HLA molecule of the patient;

predicting a surface presentation level of the neoepitope on the tumor cell and the neoepitope on the matched normal cell in silico, wherein the surface presentation level is predicted by determining an expression level of the mutated and of the matched normal HLA molecule and/or wherein the surface presentation level is predicted by measuring a binding affinity of the neoepitope to the mutated and to the matched normal HLA molecule;

creating an immunotherapeutic composition using the patient-and tumor-specific neoepitope when the predicted surface presentation level of the neoepitope bound to the mutated HLA molecule is higher than 70% of the predicted surface presentation level of the neoepitope bound to the matched normal HLA molecule of the patient;

wherein the immunotherapeutic composition is a vaccine, a neoepitope-specific affinity reagent, or a neoepitope-specific cell-based composition; and administering to the patient the created immunotherapeutic composition to treat the tumor.

2. The method of claim 1, wherein the neoepitope has a length of between 5 and 30 amino acids.

3. The method of claim 1, wherein the tumor-specific HLA mutation is an allele-specific mutation.

4. The method of claim 1, wherein the binding affinity to the mutated HLA molecule is less than 500 nM.

5. The method of claim 1, wherein the immunotherapeutic composition comprises an immune competent cell that is genetically modified to express a chimeric antigen receptor that specifically recognizes or binds to the neoepitope bound to the mutated HLA molecule.

6. The method of claim 1, wherein the vaccine comprises a virus, a yeast, or a bacteria, each being genetically modified to include a nucleic acid encoding the neoepitope bound to the mutated HLA molecule.

* * * * *